United States Patent [19]

Hallam

[11] Patent Number: 5,744,086
[45] Date of Patent: Apr. 28, 1998

[54] SLUSH MOLDING OF POLYOLEFIN POWDER COMPOSITIONS AND THE COMPOSITIONS

[75] Inventor: Martin Hallam, Ferrara, Italy

[73] Assignee: Montell North America Inc., Wilmington, Del.

[21] Appl. No.: 779,173

[22] Filed: Jan. 6, 1997

Related U.S. Application Data

[63] Continuation of Ser. No. 284,020, Aug. 1, 1994, abandoned.

[30] Foreign Application Priority Data

Aug. 3, 1993 [IT] Italy ................................ MI93A1764

[51] Int. Cl.$^6$ ............................ B29C 41/18; B29C 71/02; C08L 33/00
[52] U.S. Cl. ........................... 264/296; 264/301; 264/302; 264/306; 264/345; 525/240
[58] Field of Search ..................................... 264/301, 302, 264/296, 306, 345; 525/240

[56] References Cited

U.S. PATENT DOCUMENTS

| | | | |
|---|---|---|---|
| 4,895,903 | 1/1990 | Kobayashi et al. | 525/240 X |
| 4,937,299 | 6/1990 | Ewen et al. | |
| 4,963,612 | 10/1990 | Braga et al. | 525/240 X |
| 5,077,327 | 12/1991 | Cecchin et al. | |
| 5,109,069 | 4/1992 | Shibata et al. | 525/240 |
| 5,212,246 | 5/1993 | Ogale | 525/240 |
| 5,276,093 | 1/1994 | Kitagawa et al. | 525/240 |
| 5,286,552 | 2/1994 | Lesca et al. | 525/240 |
| 5,286,564 | 2/1994 | Cecchin et al. | 525/240 |
| 5,302,454 | 4/1994 | Cecchin et al. | 525/240 |
| 5,308,699 | 5/1994 | Hikasa et al. | |
| 5,308,908 | 5/1994 | Fukui et al. | 525/240 |
| 5,326,639 | 7/1994 | Leonard et al. | 525/240 |
| 5,360,868 | 11/1994 | Mosier et al. | 525/240 |
| 5,374,677 | 12/1994 | Nishio et al. | 325/240 |

FOREIGN PATENT DOCUMENTS

| | | |
|---|---|---|
| 0128046 | 12/1984 | European Pat. Off. . |
| 0411627 | 6/1991 | European Pat. Off. . |
| 0482778 | 4/1992 | European Pat. Off. . |
| 2-57309 | 2/1990 | Japan . |

*Primary Examiner*—Karen Aftergut

[57] ABSTRACT

Laminar articles are manufactured by slush molding polyolefin compositions in powder form composed of:

A) 10–40 parts by weight of a propylene homopolymer or copolymer;

B) 0–20 parts by weight of a copolymer fraction containing ethylene, propylene and/or a $CH_2=CHR$ α-olefin, the copolymer fraction being insoluble in xylene at ambient temperature and having an ethylene content equal to or greater than 80% by weight;

C) 50–80 parts by weight of a copolymer fraction containing ethylene, propylene and/or a $CH_2=CHR$ α-olefin, the copolymer fraction being soluble in xylene at ambient temperature and having an intrinsic viscosity in tetrahydronaphthalene at 135 C ranging from 1 to 1.4 dl/g.

7 Claims, No Drawings

SLUSH MOLDING OF POLYOLEFIN POWDER COMPOSITIONS AND THE COMPOSITIONS

This application is a continuation of application Ser. No. 08/284,020, filed Aug. 1, 1994 now abandoned.

The present invention relates to a process for the production of laminar articles by slush molding polyolefin compositions in powder form, said process being particularly suitable for the preparation of synthetic leather for automobile interiors.

Generally, said synthetic leathers require, among other things, softness, soft touch, capability of maintaining designs embossed in them and of resisting whitening after impact and bending.

The Applicant has now found that synthetic leathers having the above characteristics, and in particular displaying unusual softness, without experiencing any specific process problems, can be obtained by using powders of particular polyolefin compositions in slush molding processes In order to obtain such a high degree of softness, one must use in the polyolefin compositions great quantities of elastomeric polymer, which do not have good flowability in the molten state. Thus, it is surprising that due to the use of the polymer compositions defined below, the slush molding process of the present invention can be carried out easily and produces synthetic leathers that are very homogeneous and exhibit no irregularities.

Therefore, the present invention provides a process for the manufacture of laminar articles, in particular synthetic leathers, comprising slush molding a polyolefin composition in powder form, said composition containing the following fractions:

A) 10–40 parts by weight, preferably 20–40, of an isotactic propylene homopolymer with an isotactic index higher than 80, preferably from 85 to 98, or a random copolymer of propylene with ethylene and/or a $C_4$–$C_{10}$ α-olefin having the formula $CH_2$=CHR, wherein R is an alkyl radical with 2–8 carbon atoms, said copolymer having an ethylene and/or $C_4$–$C_{10}$ content from 1 to 10 by weight, and an isotactic index, in boiling n-heptane, higher than 80;

B) 0–20 parts by weight of a copolymer fraction containing ethylene, propylene and/or a $CH_2$=CHR α-olefin, wherein R is a $C_2$–$C_8$ alkyl radical, insoluble in xylene at ambient temperature;

C) 50–80 parts by weight, preferably 60–80, of an ethylene copolymer fraction with propylene and/or a $C_4$–$C_{10}$ α-olefin having the formula $CH_2$=CHR, wherein R is an alkyl radical with 2–8 carbon atoms, and optionally with a minor quantity of diene, said copolymer fraction being soluble in xylene at ambient temperature and having an intrinsic viscosity in tetrahydronaphthalene at 135° C. ranging from 1 to 1.4, preferably from 1.2 and 1.4 dl/g.

Preferably, the melt flow rate (MFRL according to ASTM D 1238, condition L) of the above mentioned composition ranges from 15 to 100 g/10 min.

The preferred quantity of ethylene and/or $C_4$–$C_1$ α-olefin in the copolymer of fraction A is from 2 to 5% by weight, while in fraction C the preferred quantity of ethylene is from 15 to 60% by weight, preferably from 15 to 45%.

Specific examples of $C_4$–$C_{10}$ α-olefin are: 1-butene, 1-pentene, 1-hexene, 4-methyl-1-pentene and 1 octene.

When fraction B is present, it is preferable that it be present in quantities equal to or higher than one part by weight. Said fraction is substantially a linear copolymer of ethylene, and preferably contains, besides the ethylene, the same α-olefins present in fraction C.

Preferably, the ethylene content in fraction B is higher than or equal to 75% by weight, more preferably higher than or equal to 80% by weight, with respect to the total weight of B.

The quantity of diene, when present in fraction C, is preferably from 1 to 4% by weight. Specific examples of dienes are: 1,3-butadiene, 1,4-hexadiene, 1,5-hexadiene, ethylidene1-norbornene.

The desired intrinsic viscosity for the polymer compositions to be used in the process of the present invention can be obtained directly in polymerization, by properly controlling the molecular weight regulating agent (hydrogen, for example), or can be reached by subjecting said compositions to a visbreaking process.

The visbreaking process of the polymer chains is carried by conventional techniques. One of them is based on the use of peroxides, which are added to the polymer composition in quantities that allow to obtain the desired visbreaking. The peroxides most commonly used for the visbreaking process preferably have a decomposition temperature ranging from 150° to 250° C. Examples of said peroxides are di-tert-butyl peroxide, dicumyl peroxide, 2,5-dimethyl-2,5-di(tert-butylperoxy)hexyne and 2,5-dimethyl-2,5-di(tert-butylperoxy)hexane, which is sold under the trade name Luperox 101. The quantity of peroxide necessary for the visbreaking process preferably ranges from 0.05% to 1% of the polymer weight.

The polymer compositions, whether used as such or subjected to visbreaking, can be prepared with a polymerization process comprising at least two stages: in the first stage(s) the monomers are polymerized to form fraction A, while the blends made up of ethylene-propylene, ethylene and another α-olefin, ethylene-propylene-other α-olefin, and optionally a diene, are polymerized in the subsequent stages to form fractions B and C. Examples of this type of polymerization are described in published European patent application EP-A-411627.

Due to the high content of elastomeric copolymer (fraction C), the above compositions are generally reduced to powder by milling them at very low temperature, using, for example, liquid nitrogen for the cooling action. In order to be used the process of the present invention the powders of the polyolefin compositions preferably have a narrow particle size distribution. In particular, it is preferable that not more than 10% by weight of the powder particles have a diameter smaller than 100 μm, and not more than 5% by weight have a diameter larger than 500 μm, more preferably larger than 300 μm.

The machines and process methods used for slush molding are those commonly known and used, for example, for processing polyvinyl chloride and polyurethane.

As an example, the process of the present invention comprises the following steps:

a) heating the mold (in an oven, for example) to a temperature ranging from 250° C. to 280° C.;

b) depositing the polyolefin composition powder in the mold and melting the particles of the polyolefin composition;

c) further melting the outside surface of the polymer sheet which formed in the mold of step b), by means of hot air treatment for example, in order to eliminate possible surface irregularities;

d) cooling and removing the laminar article thus obtained, which can be used as synthetic leather as such, or can be subjected to further treatments, such as embossing.

As a way of example, laminar articles which are very soft, resistant to impact whitening, very homogeneous and free of irregularities are obtained by subjecting to slush molding, to the method described above, a polyolefin composition having the particle size distribution described above and the following composition:

A) 35% by weight of crystalline propylene copolymer with 3.5% by weight of ethylene;

B) 2% by weight of copolymer fraction, containing ethylene and propylene, insoluble in xylene at ambient temperature wherein the propylene content is about 15% by weight;

C) 63% by weight of propylene/ethylene copolymer fraction, containing 27% by weight of ethylene, soluble in xylene at ambient temperature, and having an intrinsic viscosity in tetrahydronaphthalene at 135° C. of 1.3 dl/g;

said composition having a MFRL of 20 g/10 min.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A process for the manufacture of a laminar article, comprising slush molding a polyolefin composition in powder form, said composition comprising the following fractions:

A) 10–40 parts by weight of an isotactic propylene homopolymer with an isotactic index higher than 80, or a random copolymer of propylene with a comonomer selected from the group consisting of (1) ethylene, (2) a $C_4$–$C_{10}$ alpha-olefin having the formula $CH_2$=CHR, wherein R is an alkyl radical with 2–8 carbon atoms, and (3) a mixture of (1) and (2), said copolymer having a comonomer content from 1 to 10% by weight, and an isotactic index, in boiling n-heptane, higher than 80;

B) 1–20 parts by weight of a copolymer fraction wherein the copolymer is selected from the group consisting of (1) ethylene and propylene, (2) ethylene, propylene, and an alpha-olefin as defined in (A)(2), and (3) ethylene and an alpha-olefin as defined in (A)(2), which copolymer fraction is insoluble in xylene at ambient temperature and has an ethylene content equal to or greater than 80% by weight;

C) 50–80 parts by weight of an ethylene copolymer fraction wherein the copolymer is selected from the group consisting of (1) ethylene and propylene, (2) ethylene, propylene, and an alpha-olefin as defined in (A)(2), and (3) ethylene and an alpha-olefin as defined in (A)(2), said copolymer fraction being soluble in xylene at ambient temperature, and having an intrinsic viscosity in tetrahydronaphthalene at 135° C. ranging from 1 to 1.4 dl/g.

2. The process of claim 1, wherein not more than 10% by weight of particles of the polyolefin composition have a diameter smaller than 100 μm, and not more than 5% by weight have a diameter larger than 500 μm.

3. The process of claim 1, comprising the following steps:

a) heating the mold to a temperature ranging from 250° C. to 280° C.;

b) depositing the polyolefin composition in powder form in the mold and melting particles of the polyolefin composition to form a polymer sheet in the mold; b);

c) melting an outside surface of the polymer sheet which formed in the mold of step d) cooling and removing laminar articles thus obtained.

4. A composition suitable to be used in a slush molding process for the manufacture of a laminar article, comprising:

A) 10–40 parts by weight of a propylene isotactic homopolymer with an isotactic index higher than 80, or a random copolymer of propylene with a comonomer selected from the group consisting of (1) ethylene, (2) a $C_4$–$C_{10}$ alpha-olefin having the formula $CH_2$=CHR, wherein R is an alkyl radical with 2–8 carbon atoms, and (3) a mixture of (1) and (2), said copolymer having a comonomer content from 1 to 10% by weight, and an isotactic index, in boiling n-heptane, higher than 80;

B) 1–20 parts by weight of a copolymer fraction wherein the copolymer is selected from the group consisting of (1) ethylene and propylene, (2) ethylene, propylene and an alpha-olefin as defined in (A)(2), and (3) ethylene and an alpha-olefin as defined in (A)(2), which copolymer fraction is insoluble in xylene at ambient temperature and has an ethylene content equal to or greater than 80% by weight;

C) 50–80 parts by weight of an ethylene copolymer fraction wherein the copolymer is selected from the group consisting of (1) ethylene and propylene, (2) ethylene, propylene, and an alpha-olefin as defined in (A)(2), and (3) ethylene and an alpha-olefin as defined in (A)(2), said copolymer fraction being soluble in xylene at ambient temperature, and having an intrinsic viscosity in tetrahydronaphthalene at 135° C. ranging from 1 to 1.4 dl/g.

5. The composition of claim 4 in powder form, wherein not more than 10% by weight of particles have a diameter smaller than 100 μm, and not more than 5% by weight have a diameter larger than 500 μm.

6. The process of claim 1, wherein copolymers (C)(1),(2) and(3) additionally comprise 1 to 4% by weight of a diene.

7. The composition of claim 4, wherein copolymers (C)(1),(2), and (3) additionally comprise 1 to 4% by weight of a diene.

* * * * *

UNITED STATES PATENT AND TRADEMARK OFFICE
CERTIFICATE OF CORRECTION

PATENT NO. : 5,744,086
DATED : April 28, 1998
INVENTOR(S) : Martin Hallam

It is certified that error appears in the above-indentified patent and that said Letters Patent is hereby corrected as shown below:

In the Abstract, line 5, in paragraph B), change "0-20" to --1-20--.

At col. 1, line 41, change "10" to --10%--.

At col. 1, line 59, change "$C_4$-$C_1$" to --$C_4$- $C_{10}$--.

At col. 4, line 13, remove --b);-- at end of line.

At col. 4, line 15, after "step" insert --b);--.

Signed and Sealed this

Eleventh Day of August 1998

Attest:

BRUCE LEHMAN

Attesting Officer

Commissioner of Patents and Trademarks